United States Patent
Haines et al.

(10) Patent No.: US 7,237,572 B2
(45) Date of Patent: Jul. 3, 2007

(54) CHECK VALVE

(75) Inventors: Paul Mark Haines, Lebanon, OR (US); Mark A. DeVries, Albany, OR (US); Ronald J. Ender, Corvallis, OR (US); Mark Hauck, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 10/976,663

(22) Filed: Oct. 29, 2004

(65) Prior Publication Data

US 2006/0090801 A1    May 4, 2006

(51) Int. Cl.
*F16K 15/14* (2006.01)
*B41J 2/175* (2006.01)

(52) U.S. Cl. .......................... 137/843; 137/847; 347/85

(58) Field of Classification Search ................ 137/844, 137/846, 843, 847; 347/84, 85, 86
See application file for complete search history.

(56) References Cited

U.S. PATENT DOCUMENTS

| | | | |
|---|---|---|---|
| 4,263,682 A | 4/1981 | Bejarano | |
| 4,708,167 A | 11/1987 | Koyanagi | |
| 4,712,574 A | 12/1987 | Perrott | |
| 4,846,787 A | 7/1989 | Aall-Flood | |
| 5,178,281 A | 1/1993 | Enzu | |
| 5,460,200 A * | 10/1995 | Glicksman | 137/512.4 |
| 5,500,663 A * | 3/1996 | Ujita et al. | 347/86 |
| 5,830,780 A * | 11/1998 | Dennison et al. | 428/68 |
| 5,860,441 A * | 1/1999 | Garcia | 137/15.18 |
| 5,927,336 A | 7/1999 | Tanaka | |
| 6,016,829 A | 1/2000 | Tanaka | |
| 6,172,694 B1 * | 1/2001 | Droege et al. | 347/85 |
| 6,192,917 B1 * | 2/2001 | Ramos Loza | 137/223 |
| 6,247,473 B1 | 6/2001 | Yavitz | |
| 6,357,915 B2 | 3/2002 | Anderson | |
| 6,729,473 B2 | 5/2004 | Anderson | |

FOREIGN PATENT DOCUMENTS

FR    2 756 899    6/1998

* cited by examiner

*Primary Examiner*—Ramesh Krishnamurthy (57) ABSTRACT

A check valve includes two opposing sheets surfaces that are coupled together to form a flow channel there between. The flow channel has a first end, a second end and at least one direction-changing portion in between the first and second ends. A first opening is provided at the first end of the flow channel and a second opening is provided at the second end of the flow channel.

23 Claims, 5 Drawing Sheets

CHECK VALVE

BACKGROUND

There is often a need to limit the flow of a material within a system or device to one direction. Check valves are often employed for this purpose. Check valves are configured to allow flow of material in a forward direction and to not allow flow of material in a reverse direction. Check valves come in various sizes and types.

Some devices require compact and/or efficient check valves that meet certain operating requirements. One example, is an inkjet printing device wherein there is a desire to prevent ink from draining in a reverse direction from a printhead back to an ink supply. If enough ink were to drain out of the printhead, then the printhead may fail to function properly. Furthermore, many such printing devices are designed to be compact, and or requiring little maintenance.

Thus, it would be desirable to provide a check valve that is compact, efficient, and/or robust enough to provide such protection within such a printing device. These and other desires may also apply to the design of other types of devices or systems.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

Figure 1:
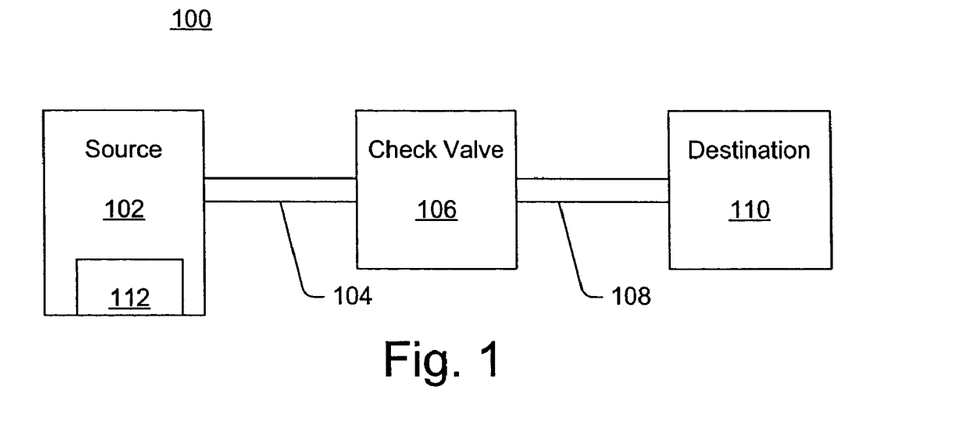
FIG. 1 is a block diagram depicting an exemplary delivery device having a check valve, in accordance with certain embodiments of the present invention.

FIG. 1 is a block diagram depicting an exemplary delivery device 100 having a check valve 106, in accordance with certain embodiments of the present invention.

Delivery device 100 is configured to allow material to flow substantially unimpeded in a forward direction from a source 102 through a connector 104 and check valve 106, and then through connector 108 to a destination 110. Delivery device 100 is further configured to substantially impede and/or otherwise prevent such material to flow in a reverse direction from destination 108 through connector 108 and check valve 106, and through connector 104 to source 102. Such flow control capability is provided by check valve 106.

Here, source 102 and/or connector 104 is/are representative of any mechanism(s) that can provide material 112 that can pass through check valve 106 when operating in the forward direction. Material 112 may include, for example, one or more liquids and/or one or more gases. Material 112 may also include other one or more solids suspended therein. Connector 108 and/or destination 110 is/are representative of any mechanism(s) that may receive the material that flows through check valve 106.

Figure 2:
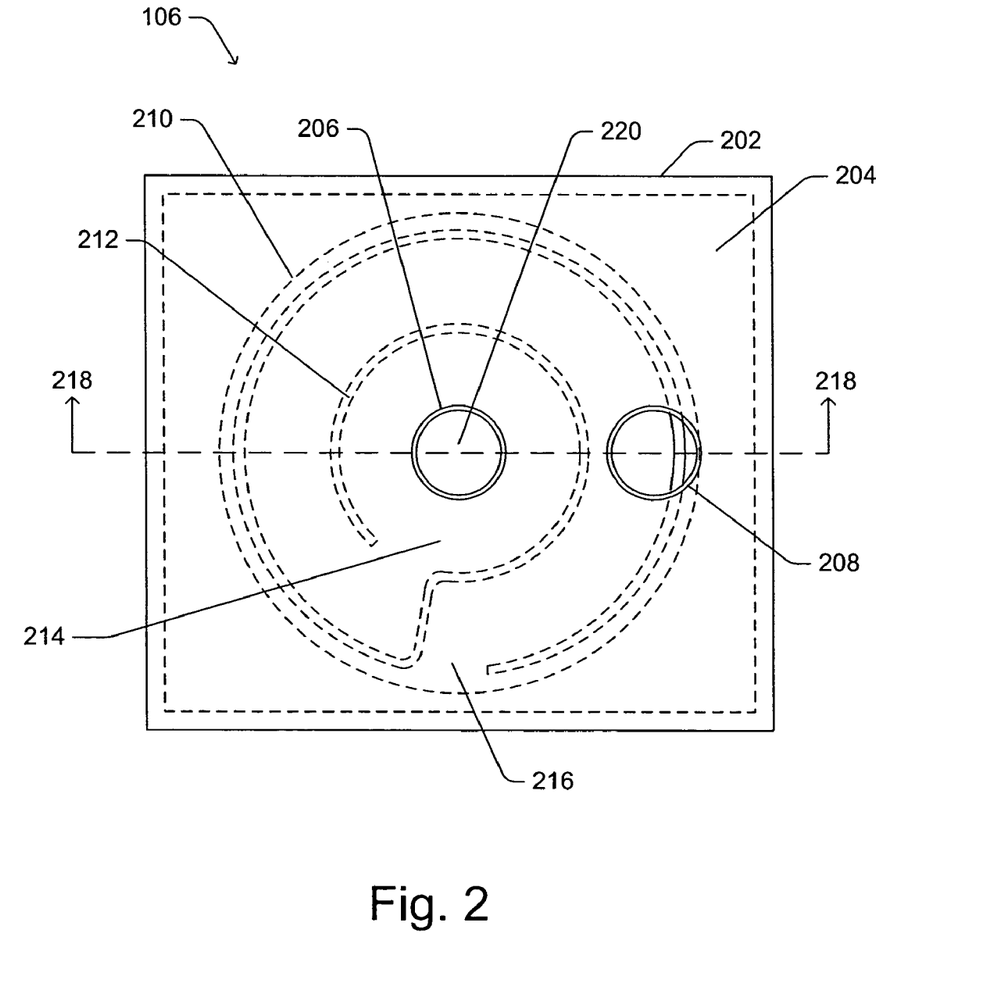
FIG. 2 is a diagram depicting a top view of an exemplary check valve, in accordance with certain embodiments of the present invention.

FIG. 2 is a diagram depicting a top view of an exemplary check valve 106 in greater detail, in accordance with certain embodiments of the present invention.

Check valve 106 is shown with dashed lines depicting internal features. Check valve 106 includes a body or housing 202 within which an internal chamber 204 is formed. Arranged within chamber 204 is a collapsible channel member 210. Channel member 210 includes, in this example, two opposing sheets of film in the shape of a circle from this top view. The sheets of film are bonded or otherwise held together along one or more paths 212. At least a part of path 212 is curved to provide for compact design and efficient operation of channel member 210. In this example, path 212 has a spiral shape that creates, between the opposing sheets, a flow channel 214 that is bounded by the bonding of the sheets along path 212.

In accordance with certain aspects of the present invention, it is desirable to have a relatively long flow channel, but not a correspondingly long check valve. Hence, by curving at least a portion of the flow channel the check valve can be more compact in size.

Flow channel 214 extends from an inlet opening 220 to an outlet opening 216. Inlet opining 220 allows material 112 to enter into flow channel 214. Outlet opening 216 allows material 112 to exit from flow channel 214. In this example, material 112 that exits from flow channel 214 through outlet opening 216 enters chamber 204. In other implementations, there may be multiple flow channels, inlet openings, and/or outlet openings.

An inlet port 206 is coupled to inlet opening 220. Inlet port 206 is configured to allow material 112 to flow into inlet opening 220 from outside housing 202. Inlet port 206 may, for example, be part of or otherwise formed as part of housing 202. In other implementations, inlet port 206 may be separate from housing 202.

An outlet port 208 is configured to allow material 112 that is within chamber 204 to flow out of housing 202. Outlet port 208 may, for example, be part of or otherwise formed as part of housing 202. In other implementations, outlet port 208 may be separate from housing 202.

Figure 3A:
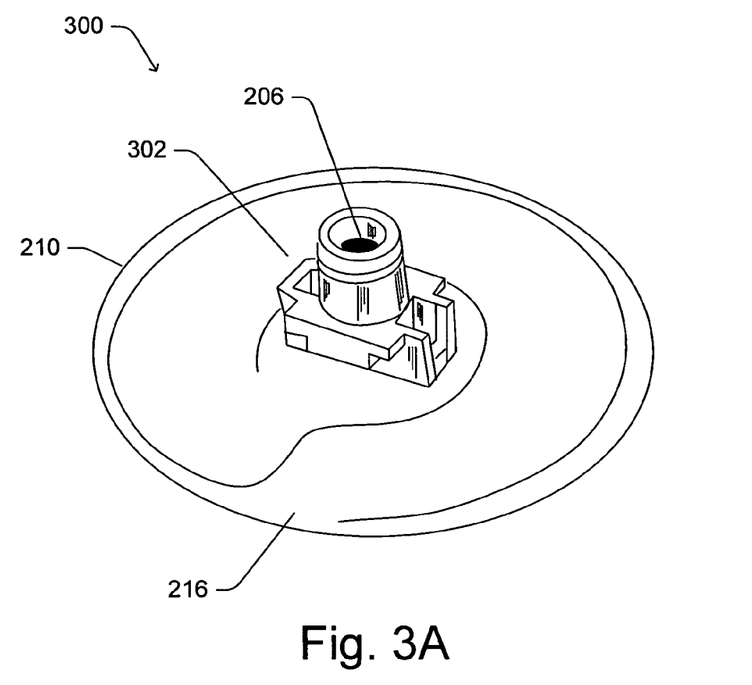
FIGS. 3A–B are illustrative diagrams depicting a three-dimensional view of an exemplary check valve, in accordance with certain other embodiments of the present invention.
Figure 3B:
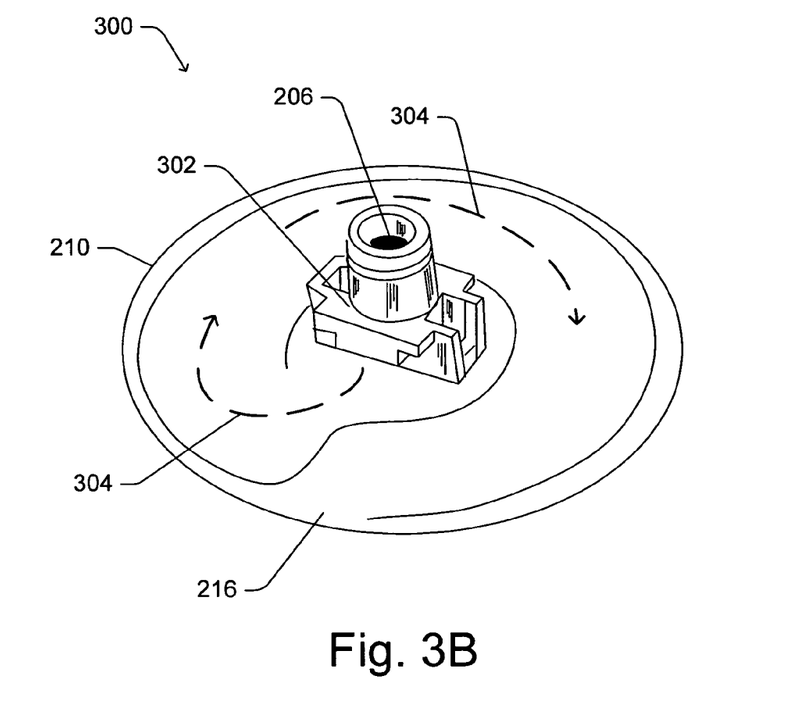

FIGS. 3A–B are illustrative diagrams depicting a three-dimensional view of a check valve 300, in accordance with certain further embodiments of the present invention.

In this example, channel member 210 has been essentially been removed from housing 202 and configured to function as a check valve. As illustrated in FIG. 3A, check valve 300 further includes an inlet port 302 that is bonded or otherwise affixed to channel member 210 at inlet port 206. In FIG. 3B, a forward direction flow of material 112 is represented by arrows 304. Here, material 112 is urged through inlet port 302 and enters into flow channel 214. When the pressure of the urged material 112 reaches a minimum forward pressure within flow channel 214, channel member 210 will change shape and/or stretch to allow normally closed flow channel 214 to "open" and allow material 112 to flow therethrough. The minimum forward pressure that is required to open flow channel 214 is based on the amount of external pressure applied to the external surfaces of channel member 210. Such external pressure can cause flow channel 214 to collapse and "close" to the flow of material 112.

In this example, with channel member 210 being outside of housing 202, the external pressure would essentially come from the surrounding environment. Thus, for example, the surrounding environment may contain air having a particular barometric pressure that is applied to the external surfaces of channel member 210. Assuming that, in this example, material 112 includes a gas, if the gas at inlet port 302 has at least the minimum forward pressure then the pressure of the gas will open flow channel 214 and flow through and out of outlet opening 216 into the atmosphere. When the pressure of the gas falls below the minimum forward pressure, the atmospheric pressure will cause flow channel 214 to close and air will be substantially inhibited if not completely prohibited from entering outlet opening 216 and/or flowing in a reverse direction through channel member 210.

Figure 4A:
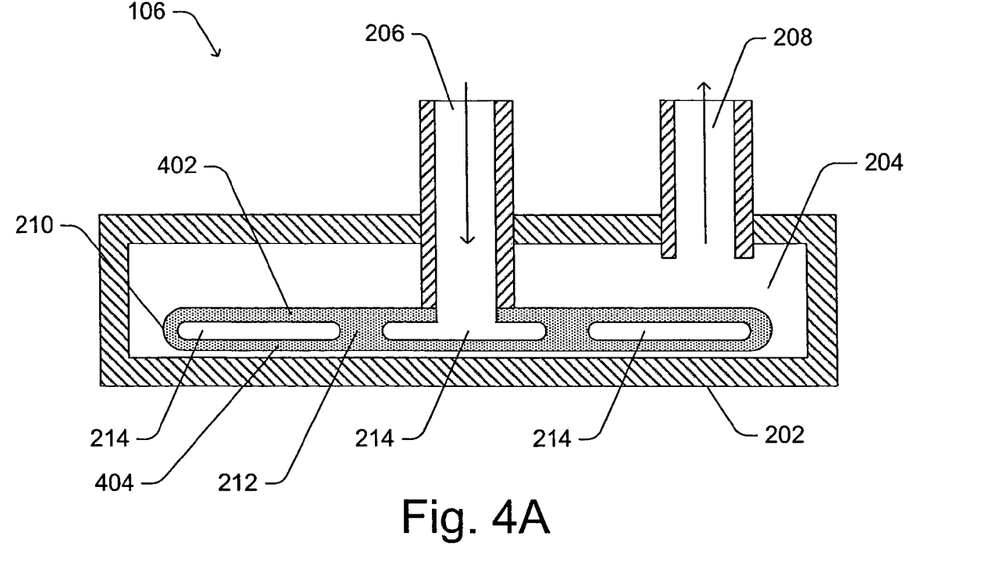
FIGS. 4A–B are diagrams depicting the exemplary check valve of FIG. 2 in cross sectional views operating in a forward direction and a reverse direction, respectively, in accordance with certain embodiments of the present invention.
Figure 4B:
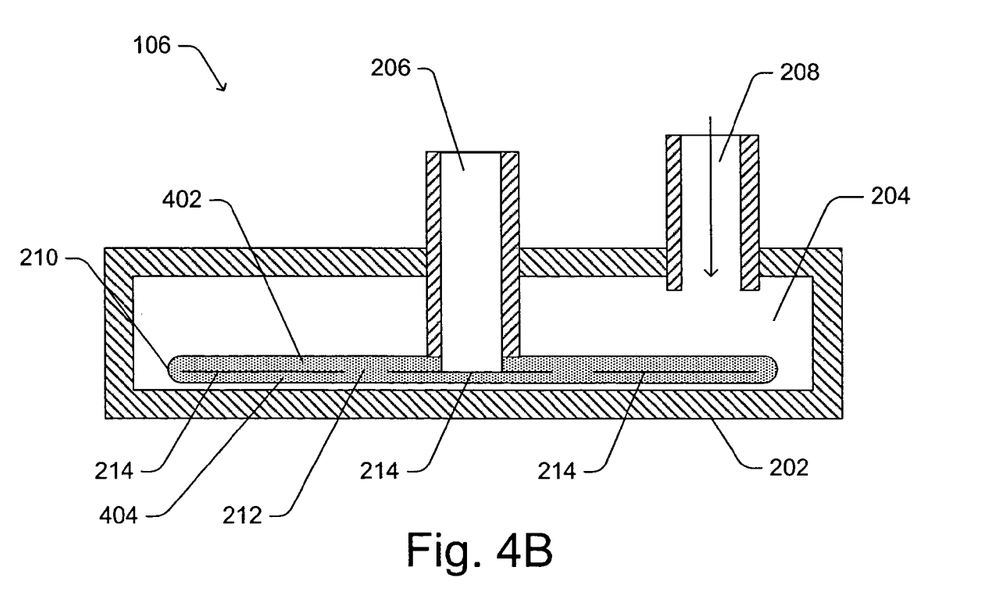

In the examples shown in FIG. 2 and FIGS. 4A–B, channel member 210 is contained within internal chamber 204 of housing 202. As such, the pressure applied to the external surfaces of channel member 210 is associated with the material within chamber 204. When material 112 includes fluid, then the minimum forward pressure will therefore be associated with the hydraulic pressure of the fluid within chamber 204. When material 112 includes gas, then the minimum forward pressure will therefore be associated with the pressure of the gas within chamber 204.

With this in mind, attention is now drawn to FIGS. 4A–B, which are diagrams depicting check valve 106 in cross-sectional side views from a line 218 of FIG. 2. In FIG. 4A check valve 106 is illustrated as operating in a forward direction wherein flow channel 214 is open. In FIG. 4B check valve 106 is illustrated as operating in a reverse direction wherein flow channel 214 is closed.

As shown in FIGS. 4A–B, channel member 210 includes an upper sheet 402 and a lower sheet 404 that having internal surfaces in opposition and held together at points associated with path 212 to form flow channel 214. In FIG. 4A, material is urged into check valve 106 through inlet port 206 with at least a minimum forward pressure. The urged material then causes flow channel 214 to open. The urged material passes through flow channel 214 and enters chamber 204. The urged material within chamber 204 is under pressure and is allowed to exit through outlet port 208.

As illustrated in FIG. 4B, when the pressure of the urged material on the inlet side of check valve 106 drops below the minimum forward pressure and/or the pressure within chamber 204 increases (thereby changing the requisite minimum forward pressure), then channel member 210 reacts by substantially or completely closing flow channel 214. Hence, when the pressure applied to all or part of the external surfaces of channel member 210 reaches a minimum reverse pressure level flow channel 214 collapses or otherwise closes. Material within chamber 204 will be substantially unable to, if not completely prohibited from, flowing in the reverse direction from outlet opening 216 (FIG. 2), when flow channel 214 is closed.

Channel member 210 in certain exemplary implementations is configured to have a first shape when flow channel 214 is open and a second shape when flow channel 214 is closed. Thus, for example, if the selected sheets of film tend not to stretch much but are flexible nonetheless, then the overall shape of channel member 210 may change by contracting and/or warping when flow channel 214 is open and then flattening out again when flow channel 214 is closed. If one or more of the selected sheets of film tend to stretch, then the overall shape of channel member 210 may also change by stretching the sheet film when flow channel 214 is open.

Those skilled in the art will recognize that various types of sheets of film or the like may be used in channel member 210. The selection of the materials that make up the sheets of film may depend, for example, on the types of materials that flow through check valve 106, the operating pressures to be encountered, the service life potential for the check valve, and/or other like factors. In certain exemplary implementations, the sheet film may include, for example, a plastic, a polymer, rubber, a metalized film, a metal foil, a composite of these materials, or other like suitable materials. Additional adhesive or other materials may also be used to form channel member 210. Single or multiple layer sheet films may be used.

Figure 6:
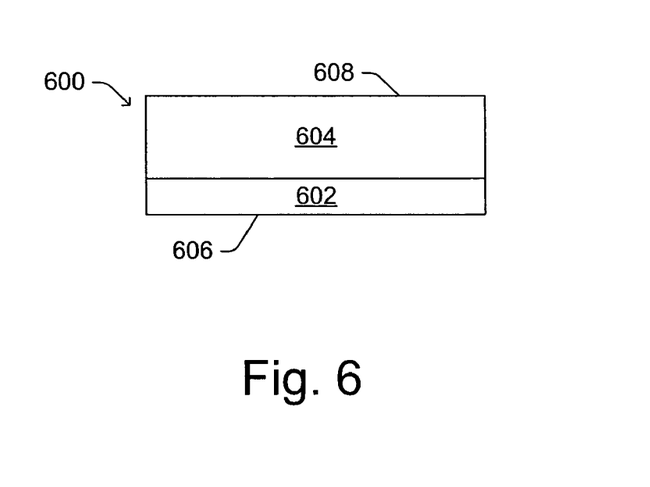
FIG. 6 is an illustrative diagram depicting a cross sectional view of an exemplary sheet of film, in accordance with certain embodiments of the present invention.

By way of example, FIG. 6 depicts a cross sectional view of an exemplary sheet film 600 having multiple layers, in accordance with certain embodiments of the present invention. Film sheet 600 includes a first layer 602 that provides an internal surface 606. Internal surface 606 is configured to form an internal wall of flow channel 214. First layer 602 may therefore be selected based on its ability to not react to the materials that flow through flow channel 214. First layer 602 may also be selected for its ability to bond to or otherwise adhere to an opposing surface to form path 212, for example. A second layer 604 is included in film sheet 600. Additional layers may also be provided between first layer 602 and second layer 604. Here, second layer 604 is configured to provide an external surface 608 that may be exposed to the material within chamber 204 or to an environment in which channel member 210 operates. Second layer 604 may therefore be selected based on its ability to not react to the materials it encounters. Second layer 604 may provide additional strength, support, or other like physical properties to sheet film 600. Second layer 604 may also be selected to bond to otherwise connect to inlet port 206/302 or other like fitment, for example.

Figure 7A:
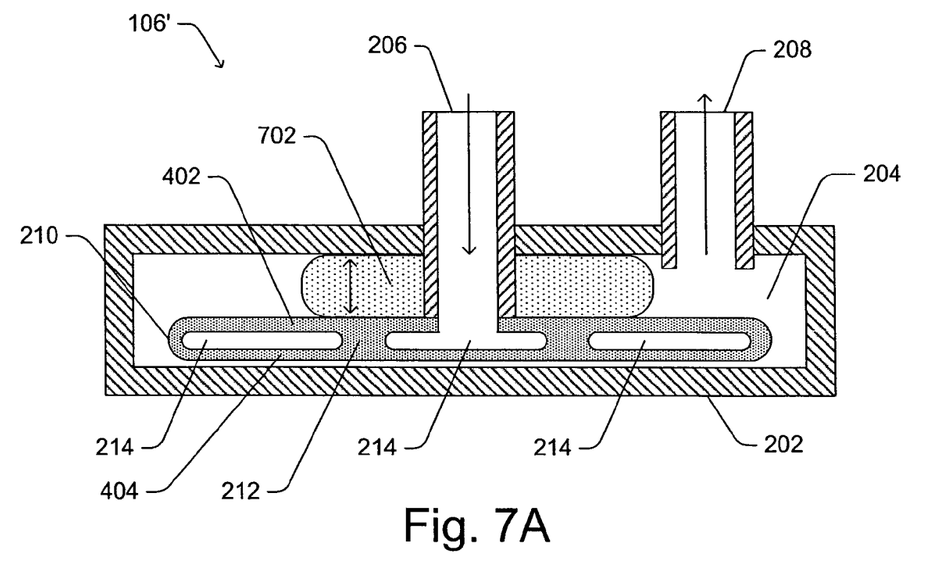
FIGS. 7A–B are diagrams depicting an exemplary check valve, similar to that in FIGS. 4A–B, in cross sectional views operating in a forward direction and a reverse direction, respectively, in accordance with certain further embodiments of the present invention.
Figure 7B:
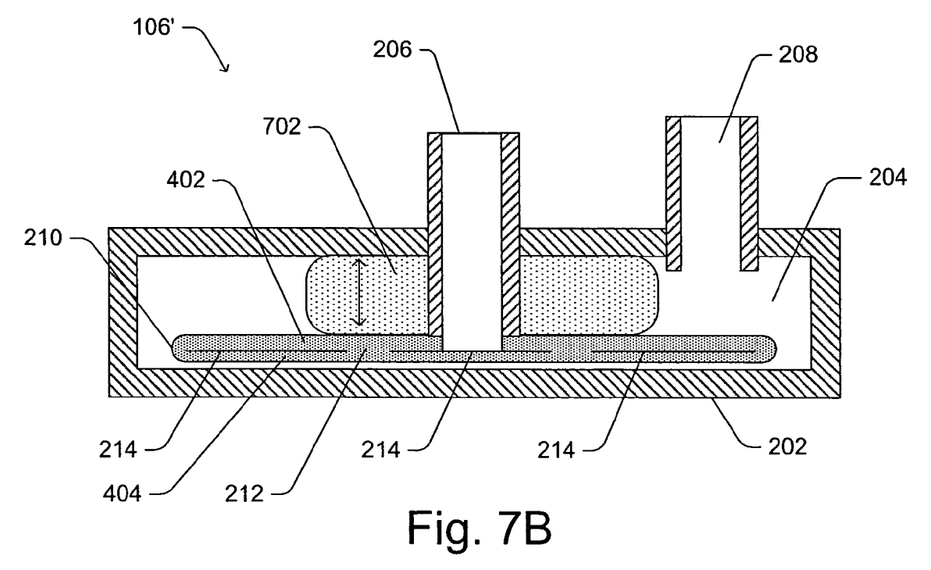

FIGS. 7A–B are diagrams depicting an exemplary check valve 106', in cross sectional view, operating in a forward direction and a reverse direction, respectively, in accordance with certain further embodiments of the present invention.

Check valve 106' is similar to that shown in FIGS. 4A–B. Check valve 106' further includes a resilient mechanism 702 that is configured to apply force/pressure to at least a portion of the external surface of channel member 210 within chamber 204. This additional force/pressure acts to close flow channel 214. Resilient mechanism 702 may include, for example, a spring, a resilient foam member, a pressurized diaphragm, or the like. A polymer film or the like may also be used as a spring, for example, if it has sufficient thickness for the application. Resilient mechanism 702 may provide all of the reverse flow pressure or a portion of the reverse flow pressure that closes flow channel 214 when the forward flow of material 112 falls below the minimum forward pressure.

FIG. 7A shows flow channel 214 in an open shape. FIG. 7B shows flow channel is a closed shape due at least in part to force applied to channel member 210 by resilient mechanism 702. While resilient mechanism 702 is depicted as having a smaller size than channel member 210, it should be understood that this is illustrative only and that certain implementations may include one or more larger or smaller mechanisms.

Figure 5:
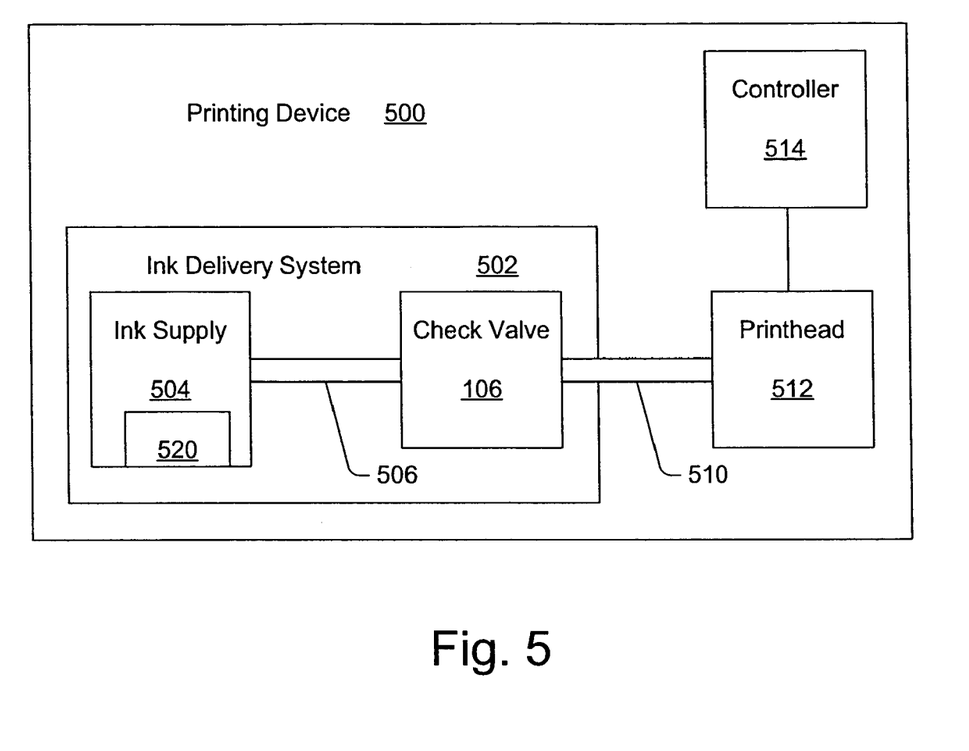
FIG. 5 is a block diagram depicting an exemplary printing device having an ink delivery system that includes a check valve, in accordance with certain embodiments of the present invention.

Attention is now drawn to FIG. 5, which is a block diagram depicting an exemplary printing device 500 having an ink delivery system 502 that includes a check valve 106, in accordance with certain embodiments of the present invention.

Printing device 500 includes ink delivery system 502, which is configured to provide ink to a printhead 512 through a connector 510. Here, it is desirable to only allow the ink to travel in this forward direction through connector 510. It is undesirable to have significant ink drainage back in the reverse direction from printhead 512 through connector 510. Accordingly, ink delivery system 502 includes check valve 106 to substantially prohibit flow of ink in the reverse direction.

As illustrated in this example, ink supply system 502 includes an ink supply 504 having ink 520 therein. Ink supply system 502 is configured to urge ink 520 from ink supply 504 through connector 506 and into check valve 106. Ink 520 may be urged in a variety of ways, including for example, gravity, external pressure, pumping, or other like techniques. Ink 520 continues to be urged through the flow channel of check valve 106, through connector 510 to printhead 512. Printhead 512 may then print with ink 520, for example, by expelling small droplets of ink 520 onto a print medium (not shown) as directed by one or more control signals from a controller 514 or other like logic/drive circuitry. An inkjet printer is one example of such a printing device.

In certain other implementations, printing device 500 may include a check valve 106', for example, as in FIGS. 7A–B that includes a resilient mechanism 702 to further control the forward/reverse flow of ink.

Although the above disclosure has been described in language specific to structural/functional features and/or methodological acts, it is to be understood that the appended claims are not limited to the specific features or acts described. Rather, the specific features and acts are exemplary forms of implementing this disclosure.

What is claimed is:

1. A check valve comprising:
   two opposing sheets surfaces coupled together to form a flow channel there between, said flow channel having a first end and a second end and at least one direction-changing portion between said first and second ends, and wherein there is a first opening at said first end of said flow channel and a second opening at said second end of said flow channel;
   a housing forming an internal chamber, and wherein said two opposing sheets surfaces are arranged within said internal chamber; and
   wherein each of said two opposing sheets surfaces has a corresponding external surface and further comprising:
   at least one resilient mechanism arranged within said internal chamber and configured to apply a closing force to at least a portion of at least one of said external surfaces to urge said flow channel towards a closed channel shape.

2. The check valve as recited in claim 1, wherein said first opening extends through one of said opposing sheets surfaces into said first end of said flow channel.

3. The check valve as recited in claim 1, wherein said two opposing sheets surfaces are configured to have a open channel shape when a material having at least a minimum forward pressure enters said flow channel through said first opening, said open channel shape allowing for said material to flaw through said flow channel from said first end to said second end and out of said second opening.

4. The check valve as recited in claim 3, wherein each of said two opposing sheets surfaces has a corresponding external surface, and wherein said two opposing sheets surfaces are configured to have a closed channel shape when said material having at least a minimum reverse pressure is applied to at least a portion of at least one of said external surfaces, said closed channel shape at least substantially prohibiting said material to enter through said second opening and flow through said flow channel from said second opening to said first end.

5. The check valve as recited in claim 3, wherein said material includes at least one gas.

6. The check valve as recited in claim 3, wherein said material includes at least one liquid.

7. The check valve as recited in claim 1, wherein said two opposing sheets surfaces are part of one or more sheets of film.

8. The check valve as recited in claim 7, wherein at least one of said one or more sheets of film includes a plurality of different material layers.

9. The check valve as recited in claim 8, wherein at least one of said plurality of different layers includes a layer comprising material selected from a group of materials comprising a plastic, a polymer, rubber, a metalized film, and a metal foil.

10. The check valve as recited in claim 1, wherein said at least one direction-changing portion includes a curved portion that spirals outwardly from said first opening to said second opening.

11. The check valve as recited in claim 1, further comprising:
   a first port coupled to said first opening, said first port being accessible through said housing.

12. The check valve as recited in claim 11, wherein said first port is part of said housing.

13. The check valve as recited in claim 1, further comprising:
   a second port that is part of said housing, said second port providing access to said internal chamber.

14. The check valve as recited in claim 1, wherein said second opening is within said internal chamber and configured to open into said chamber.

15. The check valve as recited in claim 1, wherein resilient mechanism includes at least one mechanism selected from a group of mechanisms comprising a spring, a resilient foam member, a pressurized diaphragm, and a polymer film.

16. The check valve as recited in claim 1, wherein said two opposing sheets surfaces are bonded together along a first path and along a second path offset from said first path to form said flow channel between said two opposing sheets surfaces along a direction of said first and second paths.

17. The check valve as recited in claim 16, wherein said two opposing sheets surfaces are thermally bonded together along at least one of said first path and said second path.

18. The check valve as recited in claim 16, wherein said two opposing sheets surfaces are adhesively bonded together along at least one of said first path and said second path.

19. A printing device comprising:

an ink delivery system having a check valve configured to couple to an ink supply, said check valve including:

two opposing sheets surfaces coupled together to form a flow channel there between, said flow channel having a first end and a second end and at least one direction-changing portion between said first and second ends, a first opening at said first end of said flow channel, and a second opening at said second end of said flow channel;

a housing forming an internal chamber, and wherein said two opposing sheets surfaces are arranged within said internal chamber;

a first port coupled to said first opening, said first port being accessible through said housing, wherein said first port is part of said housing;

a second port that is part of said housing, said second port providing access to said internal chamber, wherein said second opening is within said internal chamber and configured to open into said chamber; and wherein each of said two opposing sheets surfaces has a corresponding external surface and further comprising at least one resilient mechanism arranged within said internal chamber and configured to apply a closing force to at least a portion of at least one of said external surfaces to urge said flow channel towards a closed channel shape.

20. The printing device as recited in claim 19, wherein:

said first opening extends through one of said opposing sheets surfaces into said first end of said flow channel;

said two opposing sheets surfaces are configured to have a open channel shape when ink from said ink supply having at least a minimum forward pressure enters said flow channel through said first opening, said open channel shape allowing for said ink to flow trough said flow channel from said first end to said second end and out of said second opening; and each of said two opposing sheets surfaces has a corresponding external surface, and wherein said two opposing sheets surfaces are configured to have a closed channel shape when said ink having at least a minimum reverse pressure is applied to at least a portion of at least one of said external surfaces, said closed channel shape at least substantially prohibiting said ink to enter through said second opening and flow through said flow channel from said second opening to said first end.

21. The printing device as recited in claim 19, wherein said at least one direction-changing portion includes a curved portion that spirals outwardly from said first opening to said second opening.

22. The printing device as recited in claim 19, wherein said two opposing sheets surfaces are bonded together along a first path and along a second path offset from said first path to form said flow channel between said two opposing sheets surfaces along a direction of said first and second paths.

23. The printing device as recited in claim 19, further comprising:

a printhead coupled to said check valve and configured to receive ink that passes through said flow channel.

* * * * *

UNITED STATES PATENT AND TRADEMARK OFFICE
CERTIFICATE OF CORRECTION

| | | |
|---|---|---|
| PATENT NO. | : 7,237,572 B2 | Page 1 of 1 |
| APPLICATION NO. | : 10/976663 | |
| DATED | : July 3, 2007 | |
| INVENTOR(S) | : Paul Mark Haines et al. | |

It is certified that error appears in the above-identified patent and that said Letters Patent is hereby corrected as shown below:

In column 6, line 6, in Claim 3, delete "flaw" and insert -- flow --, therefor.

In column 8, line 3, in Claim 20, delete "trough" and insert -- through --, therefor.

Signed and Sealed this

Seventh Day of October, 2008

JON W. DUDAS
*Director of the United States Patent and Trademark Office*